(12) United States Patent
Goto

(10) Patent No.: US 9,830,490 B2
(45) Date of Patent: Nov. 28, 2017

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/211,542

(22) Filed: Jul. 15, 2016

(65) Prior Publication Data

US 2017/0024596 A1  Jan. 26, 2017

(30) Foreign Application Priority Data

Jul. 21, 2015 (JP) ................................. 2015-144404

(51) Int. Cl.
*G06K 7/14* (2006.01)
*G06K 19/06* (2006.01)
*H04W 12/04* (2009.01)
*H04W 12/06* (2009.01)
*H04W 84/12* (2009.01)

(52) U.S. Cl.
CPC ......... *G06K 7/1447* (2013.01); *G06K 7/1417* (2013.01); *G06K 19/06037* (2013.01); *H04W 12/04* (2013.01); *H04W 12/06* (2013.01); *H04W 84/12* (2013.01)

(58) Field of Classification Search
USPC ...................... 235/462.11; 726/4, 5
See application file for complete search history.

(56) References Cited

U.S. PATENT DOCUMENTS

| 8,806,567 B1* | 8/2014 | Venable, Sr. | H04L 63/0823 340/8.1 |
| 2013/0091548 A1* | 4/2013 | Song | H04W 12/04 726/4 |
| 2013/0276075 A1* | 10/2013 | Gong | H04W 76/02 726/5 |
| 2014/0115674 A1* | 4/2014 | Fukushima | H04W 12/06 726/5 |

FOREIGN PATENT DOCUMENTS

| JP | 2014-60623 A | 4/2014 |
| JP | 2014-230152 A | 12/2014 |

* cited by examiner

*Primary Examiner* — Allyson Trail
(74) *Attorney, Agent, or Firm* — Canon U.S.A., Inc. IP Division

(57) ABSTRACT

A communication apparatus operating as an access point of a wireless network displays an image, received a communication parameter from other communication apparatus that read the image, and creates a wireless network using the received communication parameter. Thereafter, the communication apparatus displays an image in response to a user instruction and communicates with other communication apparatuses that have read the image through the wireless network.

11 Claims, 6 Drawing Sheets

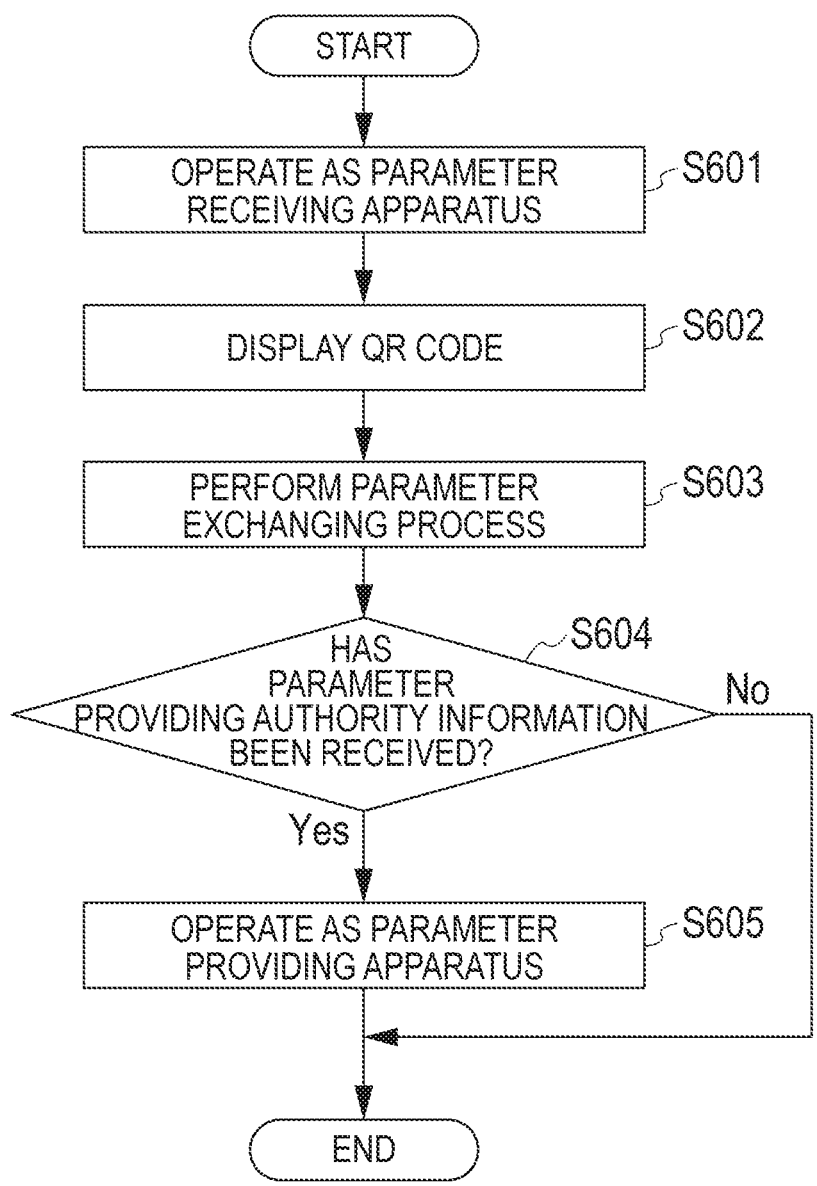

COMMUNICATION APPARATUS, METHOD FOR CONTROLLING COMMUNICATION APPARATUS, AND STORAGE MEDIUM

BACKGROUND

Field

Aspects of the present invention are generally related to communication technology.

Description of the Related Art

Recently, there have been increasing cases where an electronic device such as a digital camera, a printer, a smartphone etc., is equipped with a wireless communication function and uses the wireless communication function to connect to a wireless network.

In order to connect an electronic device to a wireless network, it is necessary to set various communication parameters such as an encryption method, an encryption key, an authentication method, an authentication key, etc. There has been devised a technique that facilitates setting of these communication parameters. Japanese Patent Application Laid-Open No. 2014-60623 has proposed a technique with which a smartphone reads a QR Code® displayed on a home appliance indicating a communication parameter, and sets the read communication parameter in an access point (hereinafter referred to as AP).

In Japanese Patent Application Laid-Open No. 2014-60623, once the communication parameter has been set in the AP, a communication apparatus newly participating in a wireless network of the AP has to acquire the communication parameter again from the smartphone or the home appliance. In this method, in order for a user to enable a new communication apparatus to participate in the wireless network of the AP, the user needs to operate the communication apparatus and a device other than the AP (the smartphone or the home appliance), and consequently, it is not a user-friendly method.

SUMMARY

According to aspects of the present invention, improvement of user-friendliness of an operation for setting a communication parameter in a case where a plurality of communication apparatuses participates in a wireless network created by an AP can be achieved.

Aspects of the present invention are directed to a communication apparatus operating as an access point of a wireless network, the communication apparatus including a first output unit, a receiving unit, a creating unit, a second output unit, and a communication unit. The first output unit outputs an image including information regarding the communication apparatus. The receiving unit receives, from a first other communication apparatus that reads the image output by the first output unit and acquires the information regarding the communication apparatus from the image, a communication parameter used when the communication apparatus operating as the access point creates a wireless network. The creating unit creates a wireless network using the received communication parameter. The second output unit outputs, after receipt of the communication parameter, an image including information regarding the communication apparatus in response to a user instruction. The communication unit communicates, through the created wireless network, with a second other communication apparatus that acquires the communication parameter from the communication apparatus by imaging the image output by the second output unit.

Further features of aspects of the present invention will become apparent from the following description of exemplary embodiments (with reference to the attached drawings).

BRIEF DESCRIPTION OF THE DRAWINGS

FIG. 6 is a flowchart illustrating an operation of a printer 102.

DESCRIPTION OF THE EMBODIMENTS

First Embodiment

Figure 1:
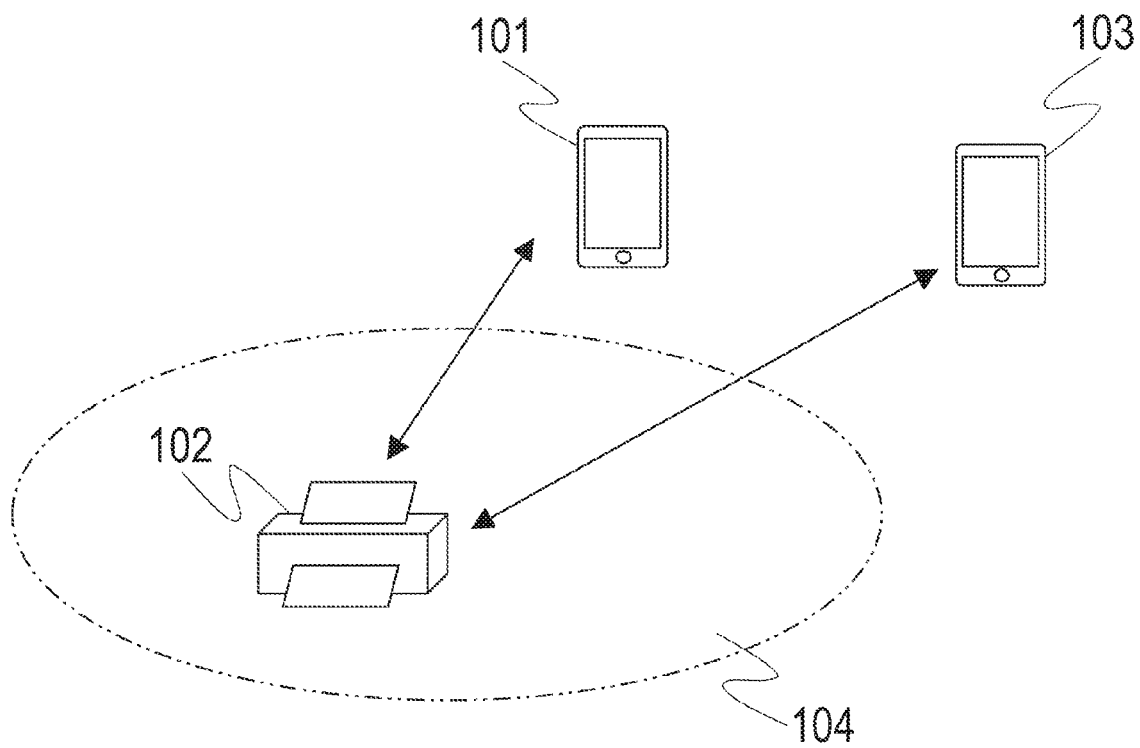
FIG. 1 is a view illustrating an example of a configuration of a communication system.

FIG. 1 illustrates a configuration of a communication system of the embodiment. In FIG. 1, 101 and 103 each denote a smartphone, 102 denotes a printer, and 104 denotes a wireless network created by the printer 102. In the embodiment, the wireless network 104 illustrated in FIG. 1 is a wireless LAN in accordance with the Institute of Electrical and Electronics Engineers, Inc. (IEEE) 802.11 series. However, the wireless network created by the printer 102 is not necessarily limited to a wireless LAN in accordance with the IEEE 802.11 standard.

In the embodiment, the printer 102 operates as an access point (hereinafter referred to as AP) in an infrastructure mode specified in the IEEE 802.11 standard. The printer 102 operates as the AP of a wireless network, thereby forming the wireless network and performing authentication and encryption processing with respect to a station (hereinafter referred to as STA), management of the STA, and the like. The smartphones 101 and 103 operate as an STA in the infrastructure mode specified in the IEEE 802.11 standard.

In the embodiment, a description will be provided regarding a case where the printer 102 creates the wireless network 104 with the use of the communication parameter provided from the smartphone 101, and then the smartphone 103 participates in the wireless network 104 to communicate with the printer 102. Each of the printer 102 and the smartphones 101 and 103 illustrated in FIG. 1 is an example of a communication apparatus, and can be a digital camera, a PC, a video camera, a smartwatch, a PDA, or various digital home appliances. The printer 102 can be other communication apparatus having an access point function or can be a communication apparatus used only as an access point. Furthermore, in the embodiment, a description will be provided using an infrastructure mode specified in the IEEE 802.11 standard as an example. However, the embodiment can be applied to a communication system in which a communication apparatus directly communicates using, for example, Wi-Fi Direct®. Therefore, the AP in the embodiment includes not only the AP in an infrastructure mode, but also a group owner specified in the Wi-Fi Direct® that serves a function corresponding to that of the AP.

Figure 2:
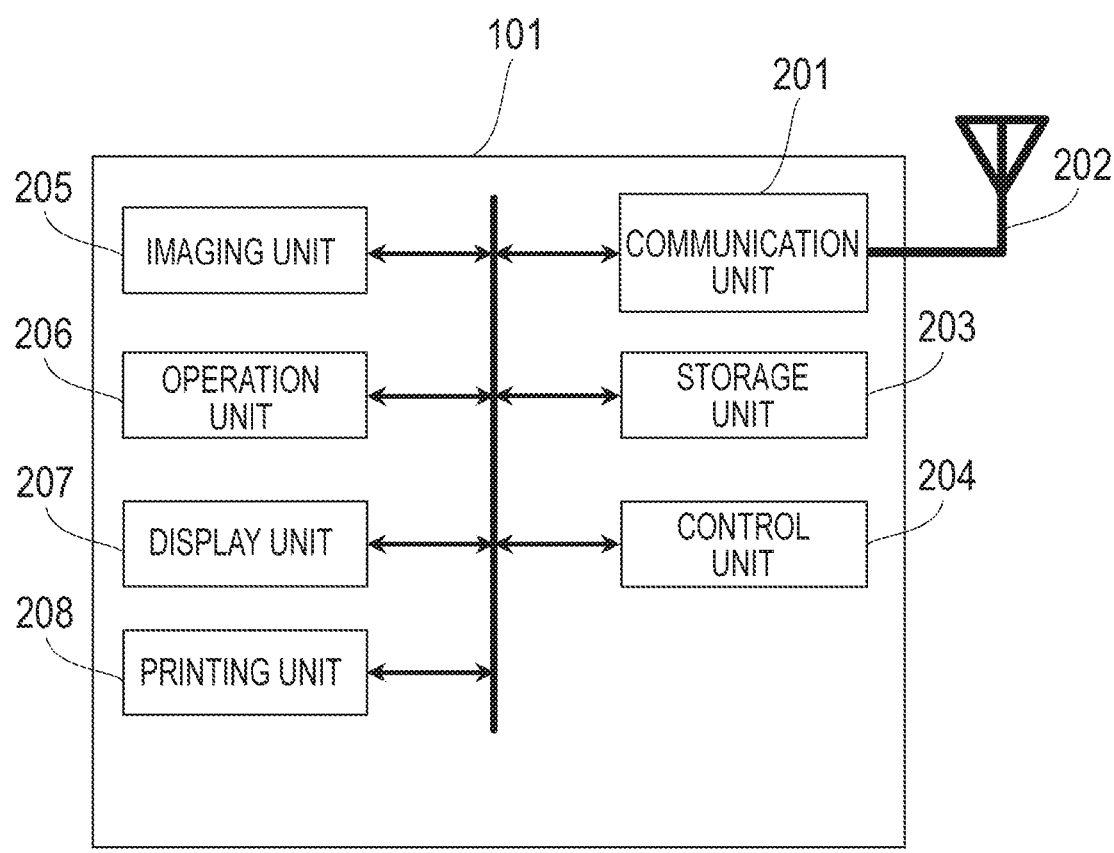
FIG. 2 is a diagram illustrating a configuration of a smartphone 101.

Next, a hardware configuration of the communication apparatus of the embodiment will be described using FIG. 2. Although the communication apparatus can be provided with an imaging unit 205 or a printing unit 208 depending on whether the communication apparatus is the smartphone 101 or 103, or the printer 102, other configuration thereof is identical. In FIG. 2, 101 denotes the communication apparatus as a whole, while 201 denotes a communication unit that performs wireless LAN communication in accordance with the IEEE 802.11 series. The communication unit 201 includes a chip configured to perform wireless communication. 202 denotes an antenna that communicates in a 2.4 GHz band and/or a 5 GHz band for performing wireless LAN communication. 203 denotes a storage unit that stores a control program executed by a control unit 204, a communication parameter, and a variety of information such as information of a communication partner apparatus. The storage unit 203 includes a storage medium such as an HDD, a flash memory, a detachable SD card, an ROM and an RAM.

204 denotes a control unit that controls the whole communication apparatus by executing the control program stored in the storage unit 203. Various operations described below are performed by the control unit 204 executing the control program stored in the storage unit 203. The control unit 204 includes, for example, a central processing unit (CPU).

205 denotes an imaging unit that includes an image pickup element, a lens, and the like, and images a photograph and a moving image. The imaging unit 205 images and reads code information of a two-dimensional code such as a bar code and a QR Code®. 206 denotes an operation unit with which a user performs various input operations to operate the smartphone 101, and an operation button, a touch UI, or the like is included therein. The operation unit 206 stores a flag corresponding to input in a memory of the storage unit 203 and the like. 207 denotes a display unit having a function of outputting visual information and/or sound information. In a case where the display unit 207 displays visual information, the display unit 207 includes a video RAM (VRAM) that retains image data corresponding to the visual information to be displayed. The display unit 207 performs display control so that image data stored in the VRAM is continued to be displayed on an LCD or an LED. 208 denotes a printing unit that prints an image or textual information on a print sheet, photographic paper, and the like.

In a case where the communication apparatus is other apparatus such as a digital camera, a PC, a video camera, a smartwatch, and a PDA, a hardware configuration according to properties of each apparatus is employed. However, a description thereof will be omitted.

Figure 3:
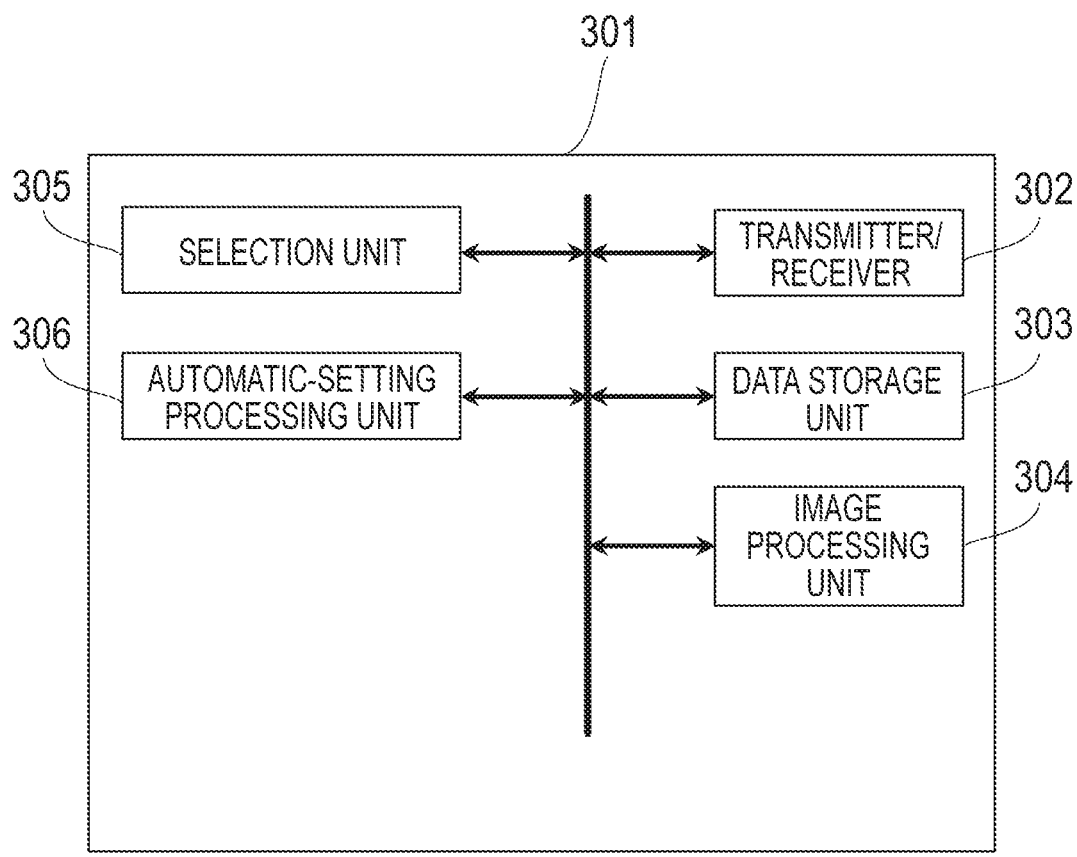
FIG. 3 is a diagram illustrating a functional configuration of the smartphone 101.

FIG. 3 illustrates an example of a configuration of a software functional block that executes a communication control function, which will be described later, included in the smartphone 101. In the embodiment, the functional block of the smartphone 101 is stored as a program in the storage unit 203, and the function thereof is executed by the control unit 204 executing the program. The control unit 204 realizes each function by performing control of each hardware, and calculation and processing of information in accordance with the control program. A part or a whole of the functional block can be prepared as hardware. In that case, the part or the whole of the functional block includes, for example, an application specific integrated circuit (ASIC).

In FIG. 3, 301 denotes the software functional block as a whole. 302 denotes a transmitter/receiver of a wireless LAN packet, and controls the communication unit 201 in order to transmit/receive various packets for performing wireless LAN communication with a counter apparatus in accordance with the IEEE 802.11 standard. 303 denotes a data storage unit that controls storage in the storage unit 203 and reading out from the storage unit 203 of a software itself, and a communication parameter, public key information used in a communication-parameter setting process and the like.

304 denotes an image processing unit that performs image processing of an image and the like read by the imaging unit 205. Decoding processing and analysis processing of code information of a QR Code® and the like described later are performed in image processing unit 304. The image processing unit 304 analyzes an image read by the imaging unit 205 and decodes encoded information to acquire the information. 305 denotes a selection unit that performs processing for selecting, among a plurality of types of communication-parameter setting process that can be executed by the smartphone 101, a type thereof to be performed. The communication-parameter setting selection process described later is performed in the selection unit 305.

306 denotes an automatic-setting processing unit that performs a communication-parameter setting process with which a communication parameter is shared between communication apparatuses. In the communication-parameter setting process, a providing apparatus that provides a communication parameter provides, to a receiving apparatus, a communication parameter used for wireless communication. Here, the communication parameter includes various parameters necessary for performing wireless LAN communication such as a service set identifier (SSID) as a network identifier, an encryption method, an encryption key, an authentication method, and an authentication key. In addition, a media access control (MAC) address, a passphrase, an IP address for performing communication in an internet protocol (IP) layer, information necessary for a high-order service and the like can be included.

The automatic setting processing unit 306 can execute a plurality of types of the communication-parameter setting process. For example, the automatic-setting processing unit 306 can execute a type thereof in which a communication parameter is shared between the smartphone 101 and other communication apparatuses.

In the communication-parameter setting process, the smartphone 101 images a QR Code® displayed on the other communication apparatus or associated with the other communication apparatus. Then, the smartphone 101 acquires information included in the read QR Code®, which is necessary for setting a communication parameter. The information necessary for setting a communication parameter is information regarding the communication apparatus of which the QR Code® has been read, and is, for example, a communication parameter itself, identification information of the communication apparatus, and identification information of the communication-parameter setting process.

Then, the smartphone 101 acquires identification information of the apparatus included in the read QR Code®. The identification information of the apparatus can be a MAC address or a universally unique identifier (UUID) that uniquely identifies a network device. The smartphone 101 provides a communication parameter to a communication apparatus specified by the identification information acquired from the QR Code®. When the communication-parameter setting process is performed, a communication parameter encrypted with a public key or a certificate can be communicated between the apparatuses. The public key can be included in the QR Code®. As a method for encrypting a communication parameter with a public key, for example, a method described in Japanese Patent Application Laid-Open No. 2014-230152 can be used.

Figure 4:
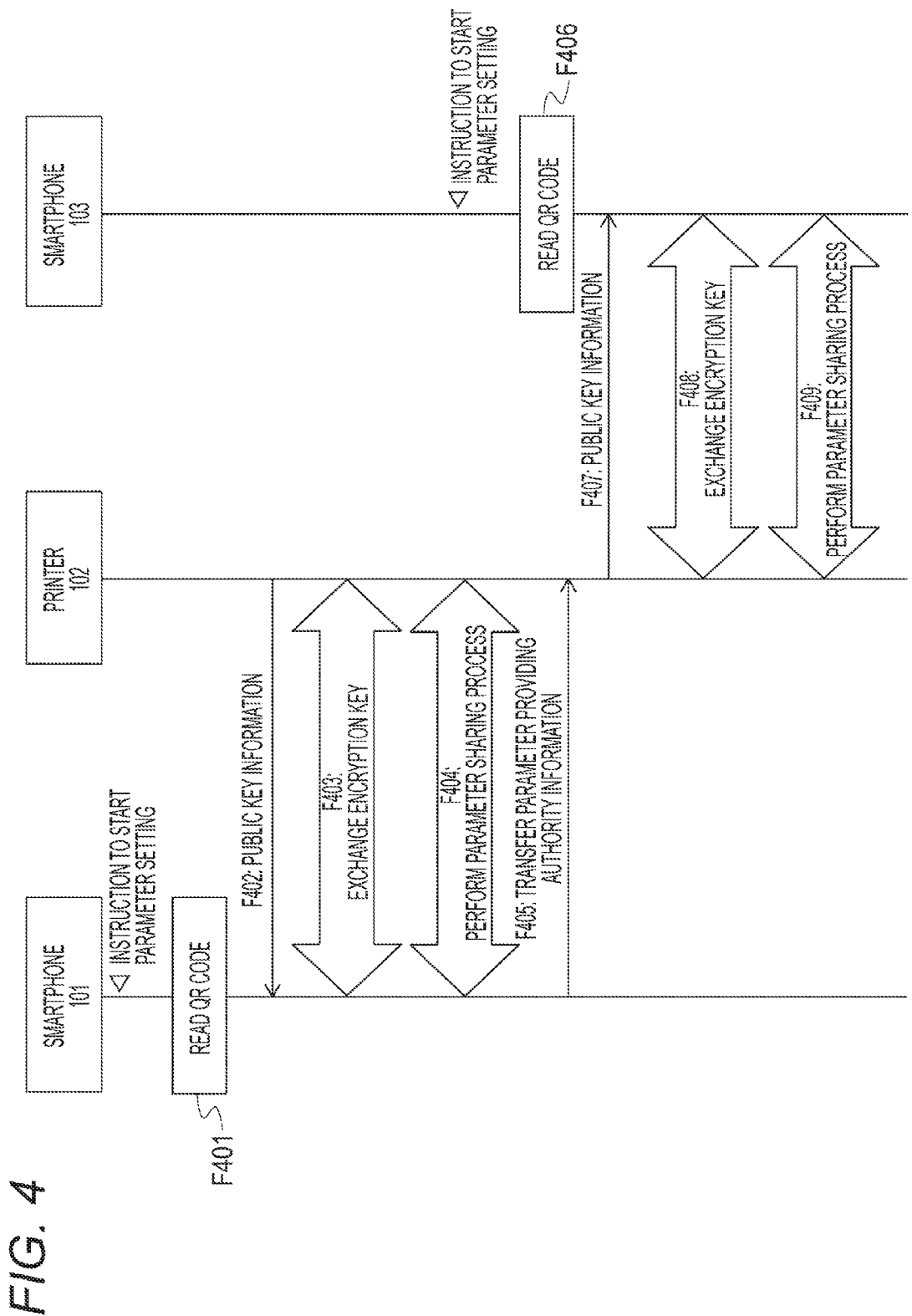
FIG. 4 is a diagram illustrating an operation sequence of the communication system.

FIG. 4 is a sequence chart illustrating an operation of each communication apparatus in the communication system of the embodiment. Hereinbelow, processing executed by each communication apparatus of the embodiment will be described using FIG. 4. FIG. 4 illustrates a sequence of operations in which the smartphone 101 reads a QR Code® to acquire information, the printer 102 is operated based on the information as an AP of a wireless LAN, and then the smartphone 103 is connected to the wireless LAN constituted by the printer 102.

When the smartphone 101 has accepted a start instruction of the communication-parameter setting process from the operation unit 206, the smartphone 101 activates the imaging unit 205, and then reads a QR Code® displayed on the printer 102 (F401). At that time, the start of the communication-parameter setting process has been instructed also in the printer 102 by a user operation, and the printer 102 displays the QR Code® on the display unit in response to the instruction. In the QR Code® displayed on the printer 102, identification information of the printer 102 and apparatus information indicating that the printer 102 is a printer (apparatus provided with a printing function) are encoded. In addition, when the printer 102 is operable as an AP of a wireless LAN, the QR Code® also includes type information indicating that the printer 102 is operable as a providing apparatus that provides a communication parameter.

When the QR Code® is imaged, public key information retained by the printer 102 is transferred to the smartphone 101 from the printer 102 (F402). The smartphone 101 performs authentication and processing for exchanging an encryption key based on a public key infrastructure (PKI) with the printer 102 using the public key information acquired from the QR Code® (F403).

Thereafter, a communication-parameter sharing process is performed between the smartphone 101 and the printer 102. Specifically, the smartphone 101 encrypts, with an encryption key acquired in F403, a communication parameter for operating the printer 102 as an AP, and provides the communication parameter to the printer 102 (F404). The printer 102 that has received the communication parameter starts operating as the AP of a wireless LAN with the received communication parameter. Specifically, the printer 102 creates a wireless network of an SSID included in the received communication parameter, and starts transmitting a beacon signal including the SSID.

Furthermore, based on the type information indicating that the apparatus is operable as a providing apparatus, which information has been acquired by the smartphone 101 from the QR Code®, the smartphone 101 transfers communication-parameter providing authority information to the printer 102 (F405). The communication-parameter providing authority information is information that allows an apparatus to operate as a providing apparatus that provides a communication parameter to other communication apparatus. The printer 102 that has received the communication-parameter providing authority information thereafter operates as a providing apparatus of a communication parameter.

Next, when the smartphone 103 has accepted a start instruction of the communication-parameter setting process from the operation unit 206, the smartphone 103 activates the imaging unit 205, and then reads a QR Code® displayed on the printer 102 (F406). At that time, the start of the communication-parameter setting process has been instructed again in the printer 102 by a user operation, and the printer 102 displays the QR Code® on the display unit in response to the instruction. Here, the smartphone 103 is a smartphone different from the smartphone 101, and for example, is a smartphone owned by a user different from the user who owns the smartphone 101. The user of the smartphone 103 desires to connect the smartphone 103 and the printer 102 through a wireless LAN, and to cause the printer 102 to perform print processing of content such as a photograph retained by the smartphone 103.

The smartphone 103 acquires from the printer 102 (F407), by reading the QR Code®, information necessary for setting the communication parameter and public key information.

The smartphone 103 performs, using the public key information acquired from the QR Code® (F408), authentication and exchange of an encryption key based on a public key infrastructure (PKI) with the printer 102.

Thereafter, a communication-parameter sharing process is performed between the smartphone 103 and the printer 102. Specifically, the printer 102 encrypts a communication parameter with an encryption key acquired in F408, and provides the communication parameter to the smartphone 103 (F409). The communication parameter provided here is the communication parameter that the printer 102 has received in F404 from the smartphone 101, which communication parameter is used for participating in the wireless LAN currently created by the printer 102. The smartphone 103 that has received the communication parameter participates in the wireless LAN created by the printer 102 using the received communication parameter. Thereafter, the printer 102 and the smartphone 103 communicate with each other through the wireless LAN.

Figure 5:
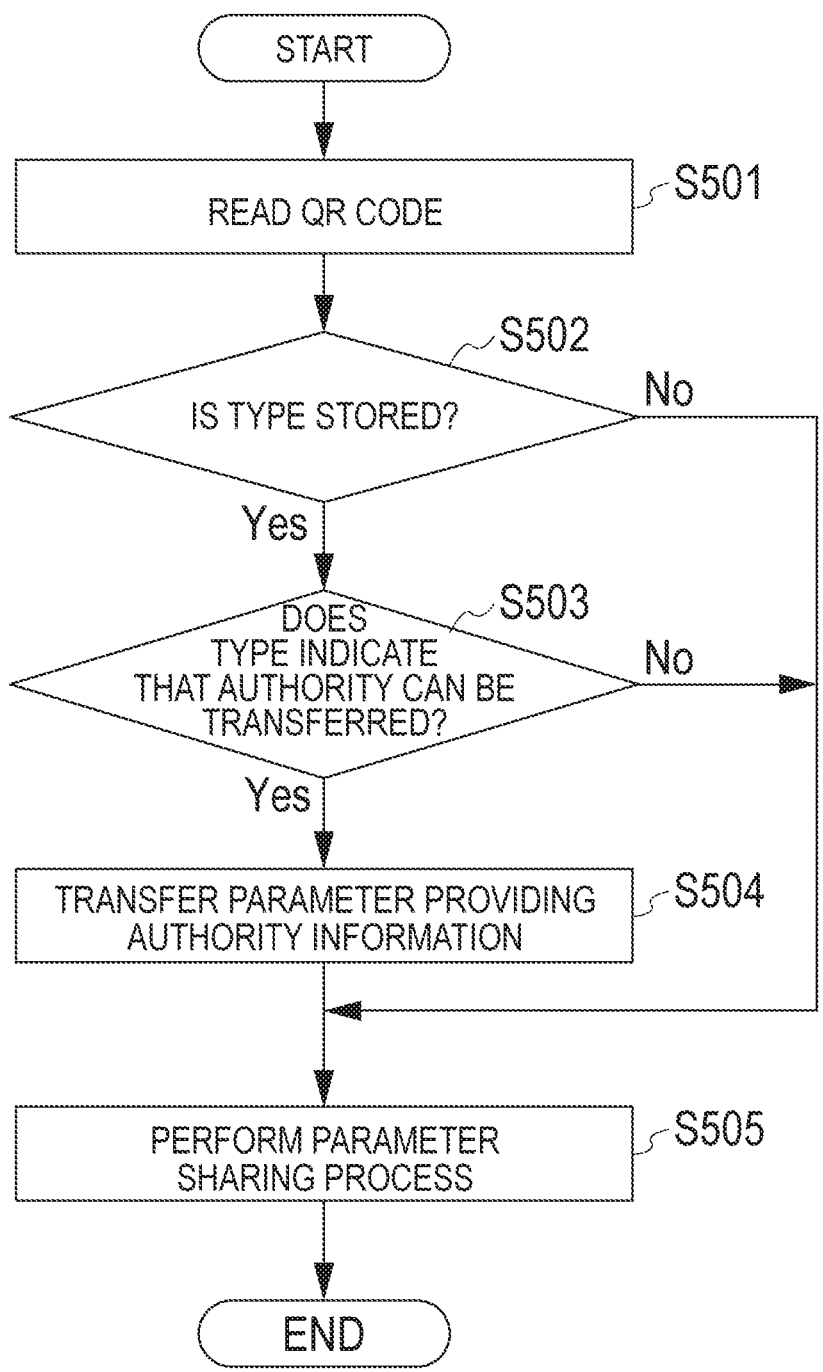
FIG. 5 is a flowchart illustrating an operation of the smartphone 101.

Next, processing executed in each of the smartphone 101 and the printer 102 in the sequence chart illustrated in FIG. 4 will be described with the use of a flowchart. FIG. 5 is a flowchart illustrating processing performed by the smartphone 101. The flowchart of FIG. 5 starts at a time point when the start of the communication-parameter setting process has been instructed from a user through the operation unit 206. Each step in FIG. 5 is performed by the control unit 204 of the smartphone 101 reading out and executing the computer program stored in the storage unit 203. Another configuration can be applied in which a part or all of the steps in FIG. 5 are realized by hardware, such as an ASIC.

After reading the QR Code® of the printer 102 by the imaging unit 205, the smartphone 101 decodes and analyzes the read QR Code®, and stores information acquired as a result of the analysis in the storage unit 203 (S501).

The smartphone 101 starts, based on the information acquired from the QR Code®, the communication-parameter setting selection process by the selection unit 305. In the communication-parameter setting selection process, first, the smartphone 101 reads out the information acquired from the QR Code® and determines whether type information is included therein (S502). Here, the type information is information indicating whether the apparatus is operable as a providing apparatus of a communication parameter.

When it has been determined as a result of the determination in S502 that the type information is included (YES in S502), the smartphone 101 determines whether the type information indicates that the apparatus is operable as a providing apparatus (S503). This determination corresponds to determination whether authority to operate as a providing apparatus can be transferred to the printer 102. When it is determined in S503 that the type information indicates the apparatus is operating as a providing apparatus (YES in S503), the smartphone 101 transmits the communication-parameter providing authority information to the printer 102 (S504). Information of the printer 102, which is a destination of the transmitted communication-parameter providing authority information, is included in the QR Code®, for example.

Thereafter, the smartphone 101 executes a communication-parameter sharing process between the smartphone 101 and the printer 102, and provides a communication parameter to the printer 102 (S505).

FIG. 6 is a flowchart illustrating processing executed in the printer 102. The flowchart of FIG. 6 starts at a time point when the start of the communication-parameter setting process has been instructed from the user through the operation unit 206. Each step in FIG. 6 is performed by the control unit 204 of the printer 102 reading out and executing the computer program stored in the storage unit 203. Another configuration can be applied in which a part or all of the steps in FIG. 6 is realized by hardware, such as the ASIC.

First, the printer 102 starts operating as a parameter receiving apparatus (S601), and outputs a QR Code® including information regarding the printer 102 through the display unit 207 or the printing unit 208 (S602). Here, the output means output through display. However, the output is not limited thereto, and can be output through printing. In the QR Code® output at that time, type information indicating that the apparatus is operable as a providing apparatus of a communication parameter is included as information regarding the printer 102, in addition to identification information, apparatus information, and information of a public key.

The printer 102 performs a communication-parameter exchanging process with the smartphone 101 that has read the output QR Code® and has acquired, from the QR Code®, the information regarding the printer 102 (S603). In the communication-parameter exchanging process in S603, the printer 102 operates as a receiving apparatus of a communication parameter, and receives a communication parameter from the smartphone 101. The communication parameter is a communication parameter used when the printer 102 creates a wireless LAN. Then, the printer 102 determines whether the communication-parameter providing authority information has been received from the smartphone 101 (S604).

When the communication-parameter providing authority information has been determined in S604 to be received, the printer 102 changes its own role from a parameter receiving apparatus to a parameter providing apparatus (S605). On the other hand, when the communication-parameter providing authority information has been determined in S604 not to be received, the role played by the printer 102 remains to be the parameter receiving apparatus. Thereafter, the printer 102 starts operating as an access point of a wireless LAN. Specifically, the printer 102 creates a wireless network of an SSID included in the received communication parameter, and starts transmitting a beacon signal including the SSID.

Specific processing performed when the printer 102 has changed its own role to the parameter providing apparatus in S605 will be described. When the printer 102 has received the communication parameter from the smartphone 101 and then has been instructed from the user to start the communication-parameter setting process, the printer 102 displays a QR Code® again. Then the printer 102 executes a communication-parameter sharing process with a partner apparatus (for example, the smartphone 103) that has read the displayed QR Code®. Here, the printer 102 operates as a parameter providing apparatus. Therefore, the printer 102 does not receive the communication parameter from the partner apparatus (for example, the smartphone 103), but provides the communication parameter to the partner apparatus (for example, the smartphone 103). Thereafter, the printer 102 communicates with the partner apparatus (for example, the smartphone 103) through the wireless LAN created by the printer 102.

When the printer 102 operates as a providing apparatus, the operation thereof is not limited to an operation for providing a communication parameter to a partner apparatus by performing the communication-parameter sharing process with the partner apparatus. For example, when the printer 102 operates as a providing apparatus, information of the communication parameter can be included in a QR Code® displayed in response to the user instruction thereafter, so that the partner apparatus can directly acquire the communication parameter from the read QR Code®. Alternatively, information of a storage destination of the communication parameter can be included in a QR Code®, so that the partner apparatus can access the storage destination of the communication parameter from the read QR Code® to acquire the communication parameter. In either case, the printer 102 receives a communication parameter from the smartphone 101, and then while operating as a providing apparatus, the printer 102 provides the communication parameter to a partner apparatus that has read the QR Code® displayed in response to the user instruction, and communicates with the partner apparatus.

As described above, according to the embodiment, it is possible to set, in a printer operating as an access point, a communication parameter used when the printer as an access point creates a wireless network, by a simple method using a smartphone. In addition, other smartphones can participate in the wireless network after the printer has started operating as an access point by a simple operation using just the smartphone and the printer.

Other Embodiments

In the above-described embodiment, the provided example is directed towards a smartphone acquiring information necessary for setting a communication parameter by reading a QR Code®. In other embodiments, methods for acquiring the information can include wireless communication such as near field communication (NFC) or Bluetooth® instead of reading a QR Code®. Wireless communication such as IEEE 802.11ad or TransferJet® can be also used. Alternatively, wired communication such as USB and Ethernet® can be used.

In the above-described embodiment, the QR Code® to be read is not limited to a QR Code® displayed on the display unit. For example, the QR Code® can be a QR Code® provided on a seal or the like and attached to a housing of a communication apparatus, or a QR Code® attached to accessories of a communication apparatus such as an instruction manual or a packaging, such as cardboard, the communication apparatus is shipped/sold in. Alternatively, code information of a QR Code® or the like directly provided to a communication apparatus or accessories of a communication apparatus can be used. In addition, while a QR Code® has been described as an example of the image imaged by the imaging unit, other one-dimensional bar codes or other two-dimensional codes other than a QR Code® can be used. Furthermore, instead of machine-readable information such as a QR Code®, information in a user-readable form, that includes for example characters, numerals, symbols, etc., can be used.

In the above-described embodiment, the description was directed to a case where communication between apparatuses is performed by wireless LAN communication in accordance with the IEEE 802.11. In other embodiments, communication can be performed using, for example, wireless communication mediums such as wireless USB, Bluetooth®, UWB, ZigBee, or NFC.

Aspects of the present invention can be realized by processing in which a program, which realizes one or more functions in the above-described embodiment, is provided to a system or an apparatus through a network or a storage medium, and one or more processors in a computer in the system or the apparatus read and execute the program. In addition, aspects of the present invention can be realized by a circuit that realizes one or more functions (for example, ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-144404, filed Jul. 21, 2015, which is hereby incorporated by reference herein in its entirety.

What is claimed is:

1. A communication apparatus operating as an access point of a wireless network, the communication apparatus comprising:
a first output unit configured to output an image including information regarding the communication apparatus;
a receiving unit configured to receive, from a first other communication apparatus that reads the image output by the first output unit and acquires the information regarding the communication apparatus from the image, a communication parameter used for creating a wireless network;
a creating unit configured to create, after receipt of the communication parameter by the receiving unit, a wireless network using the received communication parameter;
a second output unit configured to output, after receipt of the communication parameter by the receiving unit, an image including information regarding the communication apparatus in response to a user instruction; and
a communication unit configured to communicate, through the created wireless network, with a second other communication apparatus that acquires the communication parameter from the communication apparatus by reading the image output by the second output unit.

2. The communication apparatus according to claim 1, further comprising a providing unit configured to provide the communication parameter to the second other communication apparatus that has read the image output by the second output unit.

3. The communication apparatus according to claim 1, wherein the communication apparatus includes information of the communication parameter in the image output by the second output unit.

4. The communication apparatus according to claim 1, further comprising an acquisition unit configured to acquire, from the first other communication apparatus, information enabling the communication apparatus to provide the communication parameter to other communication apparatuses.

5. The communication apparatus according to claim 1, wherein the communication apparatus includes information indicating that the communication apparatus can provide the communication parameter in the image output by the first output unit.

6. The communication apparatus according to claim 1, wherein the communication parameter includes at least any of a network identifier, an encryption method, an encryption key, an authentication method, or an authentication key of the wireless network.

7. The communication apparatus according to claim 1, wherein the wireless network is a wireless LAN network in accordance with IEEE 802.11 series.

8. The communication apparatus according to claim 1, wherein the image includes a bar code or a two-dimensional code.

9. The communication apparatus according to claim 1, wherein the first output unit and the second output unit output the image through display or printing.

10. A method for controlling a communication apparatus operating as an access point of a wireless network, the method comprising:
outputting an image including information regarding the communication apparatus;
receiving, from a first other communication apparatus that reads the output image and acquires the information regarding the communication apparatus from the image, a communication parameter used for creating a wireless network;
creating, after receipt of the communication parameter by the receiving unit, a wireless network using the received communication parameter;
outputting, after receipt of the communication parameter, an image including information regarding the communication apparatus in response to a user instruction; and
communicating, through the created wireless network, with a second other communication apparatus that acquires the communication parameter from the communication apparatus by reading the image output after receipt of the communication parameter.

11. A non-transitory computer-readable storage medium storing computer executable instructions causing a communication apparatus operating as an access point of a wireless network to execute the following steps:
    outputting an image including information regarding the communication apparatus;
    receiving, from a first other communication apparatus that reads the output image and acquires the information regarding the communication apparatus from the image, a communication parameter used for creating a wireless network;
    creating, after receipt of the communication parameter by the receiving unit, a wireless network using the received communication parameter;
    outputting, after receipt of the communication parameter, an image including information regarding the communication apparatus in response to a user instruction; and
    communicating, through the created wireless network, with a second other communication apparatus that acquires the communication parameter from the communication apparatus by reading the image output after receipt of the communication parameter.

* * * * *